Patented Sept. 8, 1936

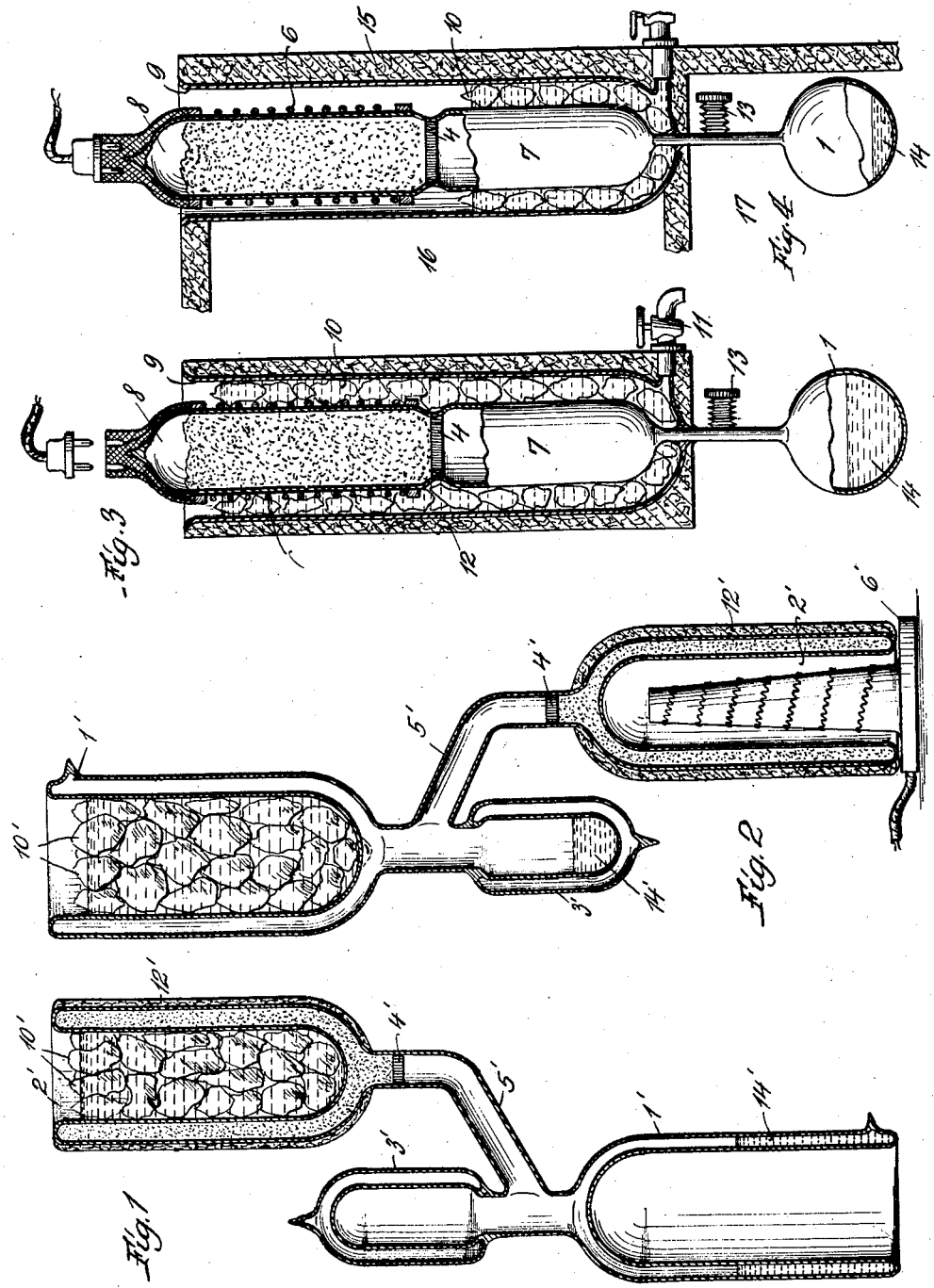

2,053,683

UNITED STATES PATENT OFFICE 2,053,683

COOLING SYSTEM

Peter Schlumbohm, Berlin, Germany

Application October 27, 1932, Serial No. 639,862
In Germany October 31, 1931

7 Claims. (Cl. 62—120)

My invention refers to a cooling system, in which water ice is used as cooling means. It is the aim of my invention to obtain in such a system lower temperatures than the freezing point of water without using freezing mixtures like ice and salt. It is the problem of the water ice industry in their competition against mechanical refrigerators and carbon dioxide ice to obtain lower temperatures than the freezing point in connection with the use of water ice, without changing the manufacturing installations of the water ice industry and without considerable costs for the client. In my new cooling system I utilize water ice of its actual qualities and heat, supplied from any source of heat like electricity, gas, and fuel. With only these two means I can obtain lower temperatures than the freezing point and I can also maintain in an ice box two or more various domains of temperature.

Following my invention I solve the aforesaid problems by using water ice in combination with an absorption machine. The absorption machine may be a periodic machine or a continuously working machine. When speaking of an absorption machine I include those machines which precisely should be called adsorption machines. An adsorption machine, using silicagel or activated charcoal is preferably used, because under the conditions of my system the efficiency of the absorption type is better than the efficiency of the normal absorption machine, in which a liquid absorbs the vapours of the refrigerant.

My invention is illustrated diagrammatically and by way of exemplification in the accompanying drawing.

Fig. 1 and Fig. 2 illustrate a cooling apparatus in two working positions, one position being 180° turned against the other one.

Fig. 3 illustrates an equipment to be inserted into a refrigerator box, allowing one temperature domain only, the temperature of which can be lower than the freezing point.

Fig. 4 shows the most important application of my invention in connection with an ice box which has to be supplied with water ice, and illustrates the fundamental advantage of having one cooling room, in which the water ice has its normal temperature effect and another one, in which temperatures lower than the freezing point can be obtained.

In accordance with my invention the absorber and/or the condenser of an absorption machine are cooled by water ice.

The absorber and/or the condenser are constructionally combined with the container for water ice, this container being open to the atmosphere, so that the ice can be refilled.

The absorption machine can be constructed with very small heat exchange surfaces of those walls, which form the absorber and the condenser, because of the intensive cooling with water ice. Therefore the absorption machine used in my system is a special machine and could not be used practically in conjunction with the normal cooling conditions for absorption machines. Not only the mechanical parts of the absorption machine are specifically constructed, but even the physical and chemical factors in selecting the absorption system are choosen with regard to the constant temperature of the freezing point available for cooling the absorber and/or the condenser. Especially absorption systems in conjunction with silicagel or activated charcoal may be selected which have not yet been used because of their being inefficient under normal cooling conditions, when the absorber and condenser are cooled with water or air, e. g. silicagel or activated charcoal for the absorption of methyl alcohol.

The cooling apparatus as shown in Fig. 1 and Fig. 2, is illustrated in Fig. 1 in the position as needed for the absorption period and in Fig. 2 in its position as needed for the heating or generating period. The evaporator 1', which may be a double walled container contains the refrigerant 14'. The absorber/boiler 2' which also may be a double walled container contains in the space between its double walls the adsorption means. The space for the adsorbing means is connected with the evaporator/condenser 1' by a tube 5', which is equipped with a filter 4'. In Fig. 1 the absorber 2' is cooled with water ice 10'. The construction of the absorber 2' as a double walled container is very practical both for keeping the absorbing means and the water ice.

In Fig. 2 the evaporator of Fig. 1 acts as condenser and is filled with ice 10'. The absorber 2' of Fig. 1 serves as a generator 2 in Fig. 2 equipped with a heating device 6' and with a heat insulating jacket 12'.

The vapours of the refrigerant expelled from the absorbing material by heating, are condensed at the ice cooled wall of the condenser 1' and drop into a collector 3'. This container is very well insulated, preferably in the form of a vacuum bottle.

When the cooling apparatus is turned from the position of Fig. 2 back to the position of Fig. 1 the condensate 14' of Fig. 2 flows back into the evaporator 1' of Fig. 1, serving there as refrigerant.

The cooling equipment of Fig. 3 and Fig. 4 is equal. In Fig. 3 the absorption period, and in Fig. 4 the heating period is illustrated.

In Fig. 3 the refrigerant 14 evaporates in the evaporator 1, passes a filter 4 and is absorbed by the absorbing material in the absorber 8. The absorber 8 is cooled by the ice 10 in the ice container 9. The process of evaporation can be regulated by a thermostatically controlled valve 13, which together with the evaporator 1 may be placed inside of a cooling room 17 which is to be cooled by the evaporator 1.

After the main part of the refrigerant 14 has been absorbed, the heating period can begin, as shown in Fig. 4. The absorber 8 is heated by the electric wire 6 after the water from melting of the ice 10 during the absorption period, has been drawn off by the tap 11. However, the water and the remaining ice 10 are only partly eliminated from the ice container 9 in order still to effect a cooling of the condenser 7. The valve 13 is shut. The vapours expelled from the absorber 8 pass the filter 4 and are condensed in the condenser 7. By opening the valve 13, stopping the heating and filling ice into the container 9 the absorption period can begin again.

Fig. 4 illustrates the possibility of cooling the cooling room 16 of an ice box 15 in the normal way by the ice 10 in the ice container 9 and of cooling a second cooling room 17 of the same ice box 15, by means of the evaporator 1, which has a lower temperature than the freezing point of water.

When using a continuously working absorption machine, the arrangement would be similar to Fig. 4 with the only difference that a continuously heated evaporator would be arranged outside of the ice box 15, whereas a continuously ice cooled condenser would be arranged inside of the ice box 15, either in the form of the condenser 1' of Fig. 2 or 7 of Fig. 3, forming a constructional unit with the container for the ice 10.

Having now particularly described and ascertained the nature of my invention and in what manner the same is to be performed, I declare that what I claim is:

1. A cooling system for utilizing water ice as cooling means for cooling the goods to be cooled to a temperature below the freezing point of water, comprising water ice and an absorption cooling unit in which a refrigerant is evaporated in heat exchange relation with the goods to be cooled, absorbed by an absorber having means to hold the water ice in heat exchange relation with said absorber and expelled from the absorber by means of heat.

2. In a refrigerating system of the type using water ice as the main cooling agent, the combination with a cooling chamber of a container adapted to contain water ice in heat exchange relation with the cooling chamber and an absorption type refrigerating unit having an absorber in heat exchange relation with the water ice and an evaporator providing a region at a temperature below the temperature of the water ice.

3. In a refrigerating system of the type using water ice as the main cooling agent, the combination with a cooling chamber of a container adapted to contain water ice in heat exchange relation with the cooling chamber and a refrigerating unit providing a region at a temperature lower than that of the water ice and comprising a container for a secondary refrigerant comprising an evaporator and an absorber, the absorber being arranged in heat exchange relation with the water ice in said container and means for applying heat to the absorber to expel the secondary refrigerant therefrom.

4. In a cold storage installation having separate compartments of different room temperatures, a refrigerating system combining water ice and an absorption machine, said water ice being arranged together with the absorber of the absorption machine in one compartment and being adapted to cool said compartment by means of said water ice, and the evaporator of said absorption machine being arranged within another compartment and being adapted to cool said compartment to a freezing temperature.

5. In a refrigerating installation having a cold storage chamber which is maintained at a preservative temperature above freezing and a freezing chamber which is maintained at a temperature slightly below freezing, a refrigerating unit comprising an absorber, a condenser and a container for maintaining a charge of water ice in heat exchange relation with the absorber and the condenser, and an evaporator in heat exchange relation with the freezing chamber and in open communication with the absorber and condenser whereby the cold storage chamber is cooled by the water ice and the freezing chamber is cooled to a lower temperature by evaporation of a refrigerant.

6. The method of operating a refrigerating apparatus of the ice box type having a chamber and ice holding means therein and a second chamber, which method comprises cooling the first mentioned chamber by heat exchange with water ice and cooling the second chamber by means of an absorption type refrigerating apparatus while cooling the heat developing parts of the latter by direct heat exchange with water ice.

7. The method of operating a refrigerating system of the ice box type having two cooling chambers one to be maintained at a temperature above and one to be maintained at a temperature below the freezing temperature of water, which method comprises cooling the first chamber by heat exchange with water ice and cooling the second chamber by means of an absorption type refrigerating unit having an evaporator in said second chamber and an absorber in the first chamber in heat exchange relation with water ice alone.

PETER SCHLUMBOHM.